US012651104B2

(12) United States Patent
Meiners

(10) Patent No.:  US 12,651,104 B2
(45) Date of Patent:  Jun. 9, 2026

(54) ALIGNING POLYGON-LIKE REPRESENTATIONS WITH INACCURACIES

(71) Applicant: PassiveLogic, Inc., Salt Lake City, UT (US)

(72) Inventor: Justin Meiners, Murray, UT (US)

(73) Assignee: PassiveLogic, Inc., Holladay, UT (US)

( * ) Notice: Subject to any disclaimer, the term of this patent is extended or adjusted under 35 U.S.C. 154(b) by 1091 days.

(21) Appl. No.: 17/722,115

(22) Filed: Apr. 15, 2022

(65) Prior Publication Data

US 2023/0334200 A1     Oct. 19, 2023

(51) Int. Cl.
*G06F 30/27*     (2020.01)
*G06F 111/10*     (2020.01)
*G06T 11/23*     (2026.01)
*G06T 11/60*     (2026.01)

(52) U.S. Cl.
CPC .............. *G06F 30/27* (2020.01); *G06T 11/23* (2026.01); *G06T 11/60* (2013.01); *G06F 2111/10* (2020.01)

(58) Field of Classification Search
CPC .... G06F 30/27; G06F 2111/10; G06T 11/203; G06T 11/60
See application file for complete search history.

(56) References Cited

U.S. PATENT DOCUMENTS

| | | | |
|---|---|---|---|
| 10,445,895 B2 | 10/2019 | Knorr et al. | |
| 10,785,413 B2 | 9/2020 | Malia et al. | |
| 11,158,031 B1* | 10/2021 | Bruce | ....................... G06T 5/80 |
| 2019/0332893 A1* | 10/2019 | Roy Chowdhury | ......................... G06F 18/2163 |
| 2020/0134896 A1* | 4/2020 | Chang | ..................... G06T 11/60 |
| 2021/0073449 A1* | 3/2021 | Segev | ..................... G06F 30/27 |
| 2021/0208262 A1 | 7/2021 | Silver et al. | |

OTHER PUBLICATIONS

Written Opinion of the International Searching Authority for International application No. PCT/US2022/043838, Dec. 22, 2022.
Written Opinion of the International Searching Authority for International application No. PCT/US22/41528, Apr. 7, 2023.
Alzantot et al., "CrowdInside: Automatic Construction of Indoor Floorplans", Sep. 17, 2012, DOI: 10.1145/2424321.2424335 Source: arXiv.
ARRayCastQuery, Apple Developer Documentation Kit, copyright 2021, https://developer.apple.com/documentation/arkit/arraycastquery, last accessed Dec. 15, 2021.
ARRaycastResult, Apple Developer Documentation Kit, copyright 2021, https://developer.apple.com/documentation/arkit/arraycastresult, last accessed Dec. 15, 2021.
Larsson et al., A study on the use of ARKit to extract and geo-reference floor plans, Linköping University, 2021.

(Continued)

*Primary Examiner* — Saif A Alhija

(57)     ABSTRACT

When given an incorrect polygonal representation of a floor plan, methods and systems described herein may be able to more accurately delineate the floorplan by optimizing between a function that determines how far in a solution vertices in the polygonal representation have moved and a function that determines how aligned the polygonal representation is.

20 Claims, 8 Drawing Sheets

(56) References Cited

OTHER PUBLICATIONS

Raycast( _:), Apple Developer Documentation Kit, copyright 2021, https://developer.apple.com/documentation/arkit/arsession/3132065-raycast/t, last accessed Dec. 15, 2021.

Scratchapixel 2.0, Ray Tracing: Rendering a Triangle, copyright 2016-2021, https://www.scratchapixel.com/lessons/3d-basic-rendering/ray-tracing-rendering-a-triangle, last viewed Dec. 15, 2021.

Yuan et al., "Finding the Best-Fit Bounding-Boxes", International Workshop on Document Analysis Systems, Springer, Berlin Germany.

Zisserman, "Lecture 2 The SVM Classifier", Oxford UK.

* cited by examiner

300
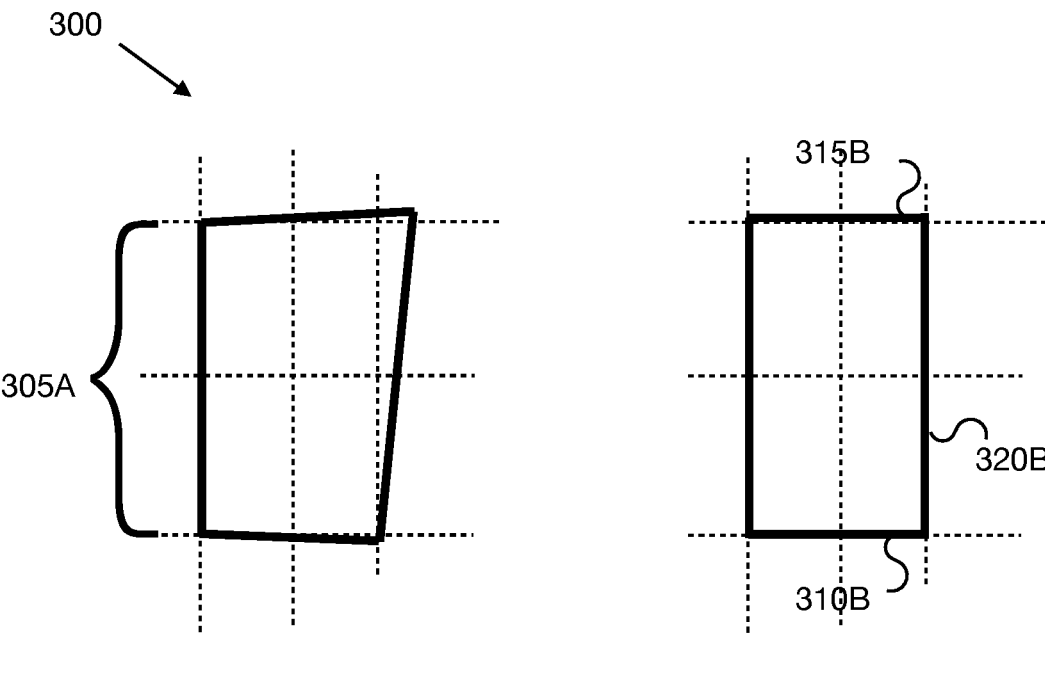
FIG. 3A                    FIG. 3B
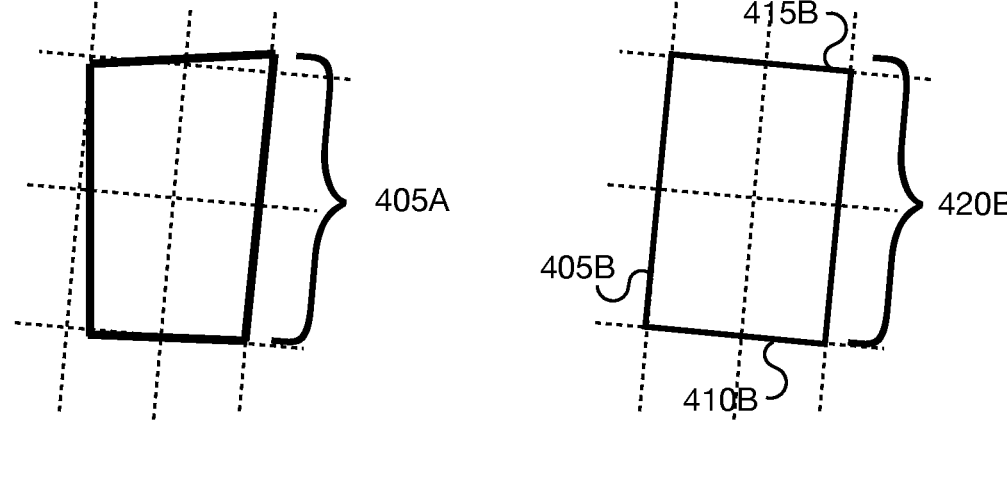
FIG. 4A                    FIG. 4B

500

700

800

900

1000

1100

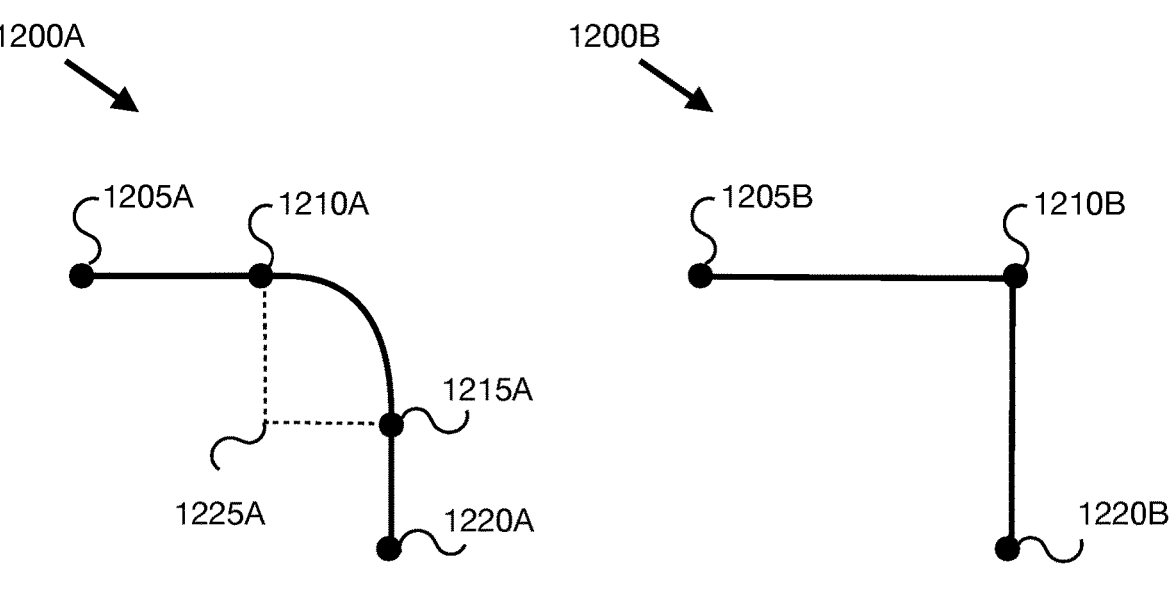
FIG. 12A           FIG. 12B
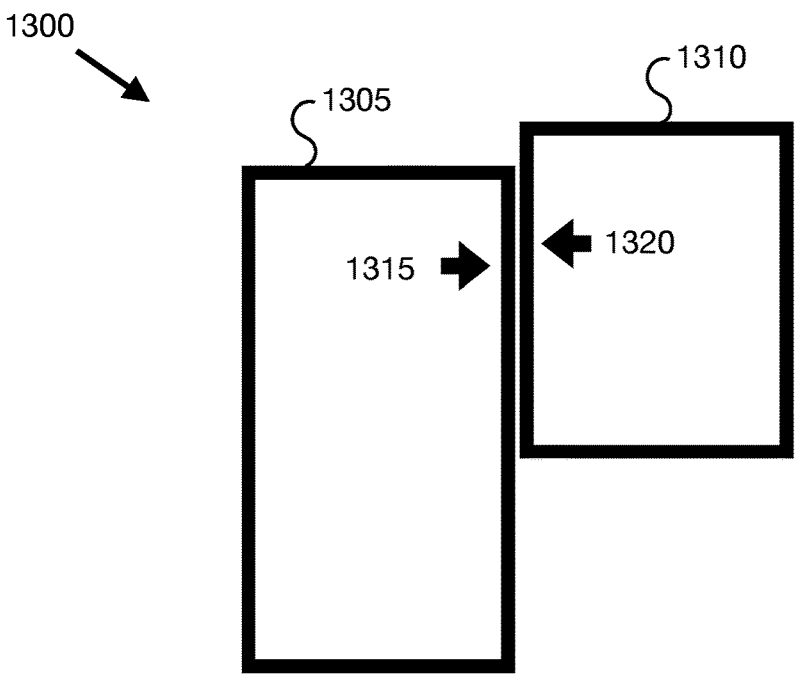
FIG. 13

ALIGNING POLYGON-LIKE REPRESENTATIONS WITH INACCURACIES

FIELD OF INVENTION

The present disclosure relates to machine learning techniques, more specifically, machine learning technique to optimize one or more sets of vertices that may comprise a floorplan.

BACKGROUND

People have long attempted to create floor plans using techniques more automated than using a measuring tape and graph paper. As a recurring difficulty, errors may be entered into the measurement through bias or random error in the measurement device, bias in summarizing the measured information to a polygonal shape, and actual errors in the building construction. FIG. 1 at 100 shows an example of such an error in a polygon. The upper polygon side 105 was measured slightly too long. The right polygon side 115 was measured at the correct length. Forcing these two measurements into an angle caused the corner 110 to be at 88° 120, rather than in its actual 90° angle, shown at the intersection of lines 105 and 125. Solving this problem traditionally takes quite a bit of human intervention, and occasionally guesswork. FIG. 2 at 200 shows the polygon with its correct dimensions. Dashed lines 215, 220, 230 and 235, along with original lines 205 and 210 show the correct polygon. Due to one error on line length, four of the original six lines needed to be adjusted.

One solution is to try to align the polygon to a grid. A rounding distance is selected, then every coordinate is rounded to its point on the grid. This is very difficult to do without significantly altering the original shape. We might pick a side (such as the longest) and base the coordinates off of that. However this assumes that the chosen side is "correct" and that all the others must be changed to match. This introduces significant error, as every other point is moved to match. FIG. 3A shows an unaligned shape 300 on a 2D coordinate grid that that has been constructed as a percent of the side 305A. FIG. 3B shows the shape snapped to fit the grid. Three sides, 310B, 315B, and 320B have all been adjusted; but the adjustment is of unknown quality.

A similar problem occurs if the coordinate system is based on the best-fit bounding box. A single point may only need to be a moved a small amount to align the shape, but a poor initial alignment results in all points being shifted. FIG. 4A shows the same unaligned shape as in FIG. 3A on a 2D coordinate grid that has been constructed as based on a best-fit bounding box. A different side, 420A, has been left largely unchanged; however three sides, 405B, 410B, and 415B, may need to be shifted. Choosing different methods leads to potentially quite different orientations and shapes of the polygon, to such an extent it is not clear if these methods increase or decrease error.

Grids are implicitly drawn which closely match the shape size, but choosing grid density is a significant challenge. Choosing a grid finer than the largest error will result in shapes not being aligned. Choosing a grid coarser than the error will result in shape distortion. In practice shapes have many features which vary significantly in size so there is no obvious choice. FIG. 5 at 500 shows a complex floor plan with grid lines of various densities, none of which can capture both alignment and shape preservation.

It would be of benefit to be able to correct these minor variations in position and angle automatically, while minimizing the amount the shape is modified.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In general, some technologies described herein describe using machine learning techniques to align a floor plan model with inaccuracies.

In embodiments, a computer-implemented method of aligning a polygon-like representation that comprises a floor plan is disclosed, the floor plan having inaccuracies, the computer-implemented method comprising: identifying vertices of the polygon-like representation; iteratively: computing a first cost function which measures how well the vertices of the polygon-like representation are aligned; computing a second cost function which measures how far the vertices of the polygon-like representation have been moved from their original locations; evaluating a stopping criteria using the first cost function and the second cost function; and using machine learning to determine new positions of the vertices of the polygon-like representation using the first cost function and the second cost function; and when the stopping criteria is met, generating a polygon-based model of the floor plan based on the new positions of the vertices of the polygon-like representation.

In embodiments, the machine learning comprises gradient descent optimization, or a Nelder-Mead optimization method.

In embodiments, the polygon-like representation is two-dimensional.

In embodiments, the second cost function comprises:

$$g(x_1, \ldots, x_n) = \sum_{i=1}^{n} \|x_i - p_i\|^2.$$

In embodiments, the first cost function comprises: selecting a minimum angle increment; identifying positions of the vertices; determining segments from the positions of the vertices of the polygon-like representation; for each two adjacent segments determining a current angle; for each two adjacent segments determining a multiple of the minimum angle increment closest to the current angle to designate a corresponding target angle; and determining a total difference of squares between each current angle and each corresponding target angle.

In embodiments, a total difference of squares comprises:

$$f(x_1, \ldots, x_n) = \sum_{i=1}^{n} \|\arccos(\langle x_{i+1} - x_i, x_i - x_{i-1} \rangle) - \theta_i\|^2.$$

In embodiments, evaluating a stopping criteria using the first cost function and the second cost function comprises a weighting of the first cost function and a weighting of the second cost function reaching a minimum value.

In embodiments, the weighting of the first cost function is 1.0 and the weighting of the second cost function is 0.5.

In embodiments, the polygon-like representation comprise at least one segment that is a curve, and wherein when a segment that is a curve between a first curve measurement and a second curve measurement joins two line segments, then deleting the segment that is a curve and joining the two line segments.

In embodiments, a second polygon-like representation with a second segment is included, the second segment adjacent to a first segment in the polygon-like representation and wherein the first cost function further comprises a preference for the first segment and the second segment to be parallel.

In embodiments, a system to correct a polygon-like representation that comprise a floor plan is disclosed, the floor plan with inaccuracies, using machine learning optimization, the system comprising: a memory; a processor in operable communication with the memory, the processor configured to correct a two-dimensional polygon-like representation that comprise a floor plan, comprising: identifying vertices of the polygon-like representation; iteratively: computing a first cost function which measures how well the vertices of the polygon-like representation are aligned; computing a second cost function which measuring how far the vertices of the polygon-like representation have been moved from their original locations; evaluating a stopping criteria using the first cost function and the second cost function; and using machine learning to determine new positions of the vertices of the polygon-like representation using the first cost function and the second cost function; and when the stopping criteria is met, generating a polygon-based model of the floor plan based on the new positions of the vertices of the polygon-like representation.

In embodiments, the first cost function comprises: selecting a minimum angle increment; identifying positions of the vertices; determining segments from the positions of the vertices of the polygon-like representation; for each two adjacent segments determining a current angle; for each two adjacent segments determining a multiple of the minimum angle increment closest to the current angle to designate a corresponding target angle; and determining a total difference of squares between each current angle and each corresponding target angle.

In embodiments, the minimum angle increment is 7.5 degrees.

In embodiments, further comprising a second polygon-like representation with a second segment, the second segment adjacent to a first segment in the polygon-like representation and wherein the first cost function further comprises a preference for the first segment and the second segment to be parallel.

In embodiments, the preference for the first segment and the second segment to be parallel comprises $$f(x_1, \ldots, x_n) = \sum_{i=1}^{n} \|\arccos(\langle x_{i+1} - x_i, x_i - x_{i-1} \rangle) - \theta_i\|^2.$$

In embodiments, a computer-readable storage medium configured with data and instructions which upon execution by at least one processor cause one or more devices to perform an optimization method of aligning a polygon-like representation that comprises a floor plan with inaccuracies, the optimization method comprising: identifying vertices of the polygon-like representation; iteratively: computing a first cost function which measures how well the vertices of the polygon-like representation are aligned; computing a second cost function which measures how far the vertices of the polygon-like representation have been moved from their original locations; evaluating a stopping criteria using the first cost function and the second cost function; and using machine learning to determine new positions of the vertices of the polygon-like representation using the first cost function and the second cost function; and when the stopping criteria is met, generating a polygon-based model of the floor plan based on the new positions of the vertices of the polygon-like representation.

In embodiments, an ingoing segment and an outgoing segment; and wherein when the stopping criteria is met then simplifying vertices by iterating through each vertex and removing those for which an angle between the ingoing segment and the outgoing segments is beneath some threshold.

In embodiments, the angle between the ingoing segment and the outgoing segment is determined by $$\theta = \frac{\arccos(\langle x_i - x_{i-1}, x_{i+1} - x_i \rangle)}{\|x_i - x_{i-1}\| \|x_{i+1} - x_i\|}.$$

In embodiments, the polygon-based model of the floor plan is capable of being used to modify equipment location at a location represented by the floor plan.

In embodiments, the polygon-based model of the floor plan is capable of being used to determine sensor placement at a location represented by the floor plan.

These, and other, aspects of the invention will be better appreciated and understood when considered in conjunction with the following description and the accompanying drawings. The following description, while indicating various embodiments of the embodiments and numerous specific details thereof, is given by way of illustration and not of limitation. Many substitutions, modifications, additions or rearrangements may be made within the scope of the embodiments, and the embodiments includes all such substitutions, modifications, additions or rearrangements.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

FIG. 3A discloses an irregular polygon aligned to a grid based on a coordinate system developed from a side of the polygon.

FIG. 3B discloses the irregular polygon of FIG. 3A snapped to the grid shown in FIG. 3A.

FIG. 4A discloses an irregular polygon aligned to a grid based on a best fit bounding box.

FIG. 4B discloses the irregular polygon of FIG. 4A snapped to the grid shown in FIG. 4A.

FIGS. 12A and 12B disclose a curve pattern that may be replaced with straight segments with which embodiments disclosed herein may be implemented.

FIG. 13 discloses a preferred alignment between adjacent polygons with which embodiments disclosed herein may be implemented Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Figure 1:
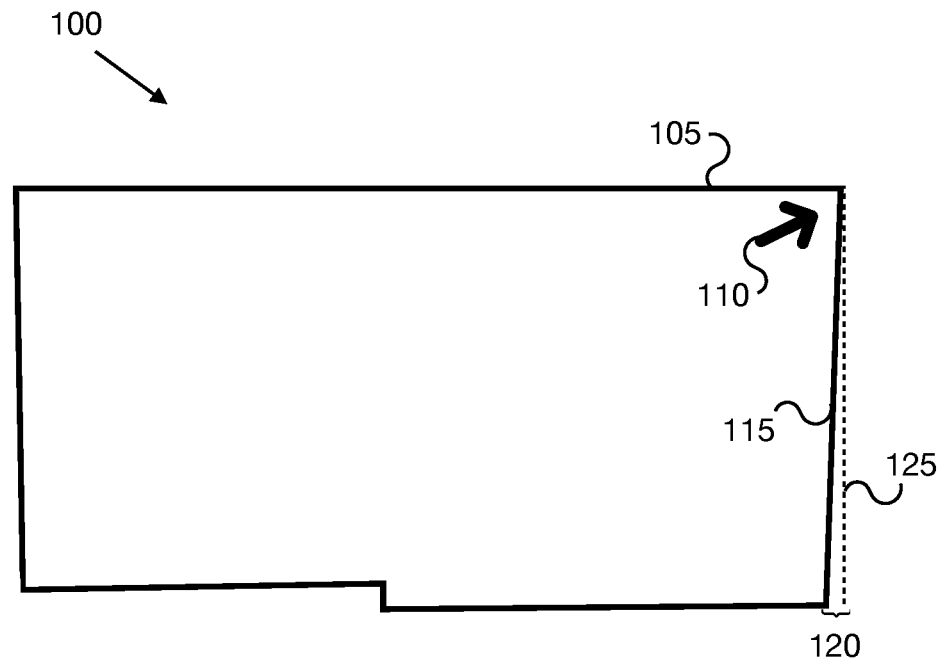
FIG. 1 discloses a polygon with one side that was measured incorrectly.

Disclosed below are representative embodiments of methods, computer-readable media, and systems having particular applicability to systems and methods for warming up a simulation. Described embodiments implement one or more of the described technologies.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

In addition, it is appreciated that the figures provided herewith are for explanation purposes to persons ordinarily skilled in the art and that the drawings are not necessarily drawn to scale. To aid the Patent Office and any readers of any patent issued on this application in interpreting the claims appended hereto, applicants may wish to note that they do not intend any of the appended claims or claim elements to invoke 35 U.S.C. 112(f) unless the words "means for" or "step for" are explicitly used in the particular claim.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may be referred to as a "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized. "Determine" means to get a good idea of, not necessarily to achieve the exact value. For example, it may be possible to make further improvements in a value or algorithm which has already been determined.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

The technical character of embodiments described herein will be apparent to one of ordinary skill in the art, and will also be apparent in several ways to a wide range of attentive readers. Some embodiments address technical activities that are rooted in computing technology, such as determining more efficient ways to align polygon-like representations produced from point clouds created from LiDAR and similar scans. The current inaccurate polygons that are generated automatically tend to be ugly shapes that do not work well with CAD tools. For example, Snapping, aligning, etc., all have problems. Disclosures and embodiments presented herein provide a framework for correcting such errors. Such disclosures also provide for the quicker creation of more-accurate polygons; aligning polygons that used to require human intervention to be machine run, etc. These improvements allow for floor plans and the like to be generated much more quickly, for the resultant plans to be much more useable in existing CAD systems, for the plans to be more aesthetically pleasing, and the like. Other advantages based on the technical characteristics of the teachings will also be apparent to one of skill from the description provided.

1. Overview

We disclose here systems and methods to align polygon-like representations with inaccuracies. Disclosures herein provides a framework for correcting these kinds of errors using specific relationships relating to buildings and floor plans. In some embodiments, multi-variable optimization on the position of each vertex is used in order to satisfy preferences. Attempts to correct these minor variations in position may be based on the following justifications. Architects and engineers design buildings using rational, organized, geometric methods. A measured angle between two adjacent walls of 92.379 degrees was likely designed to be 90 degrees. Specific points of a building may be structurally connected. For example, two points on opposite facing walls may be joined by a ceiling support. We can then infer that they should align together on the floor plan. Further, manipulating shapes in a CAD or drawing program will be easier if the length and angles are aligned. Also, users prefer to see and work with shapes that are aligned together. That is, it is an aesthetic preference for digital representation even if the representation is not physically correct.

Figure 2:
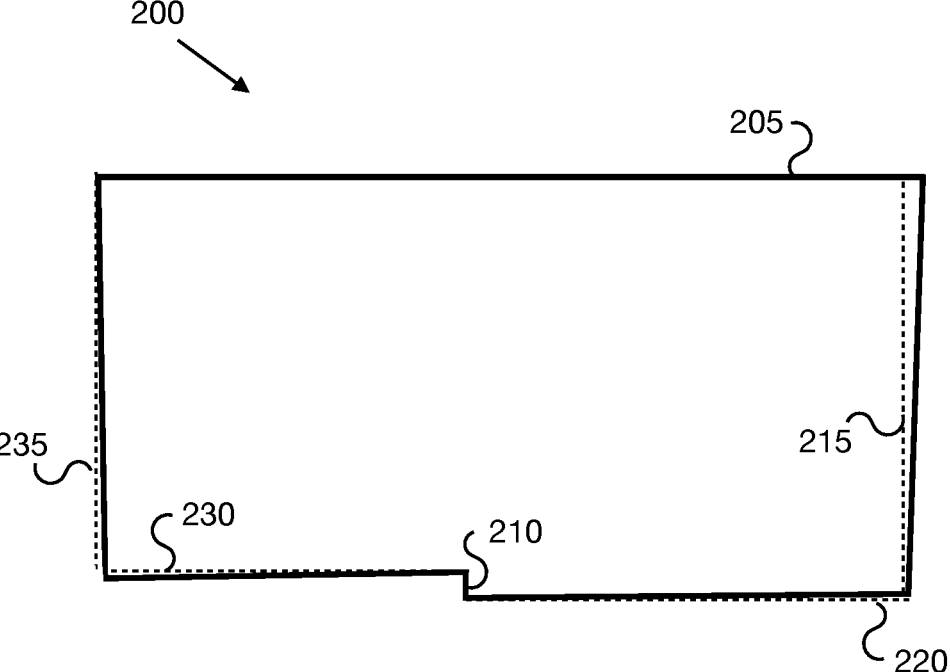
FIG. 2 discloses the polygon from FIG. 1 with its correct form overlaid.
Figure 5:
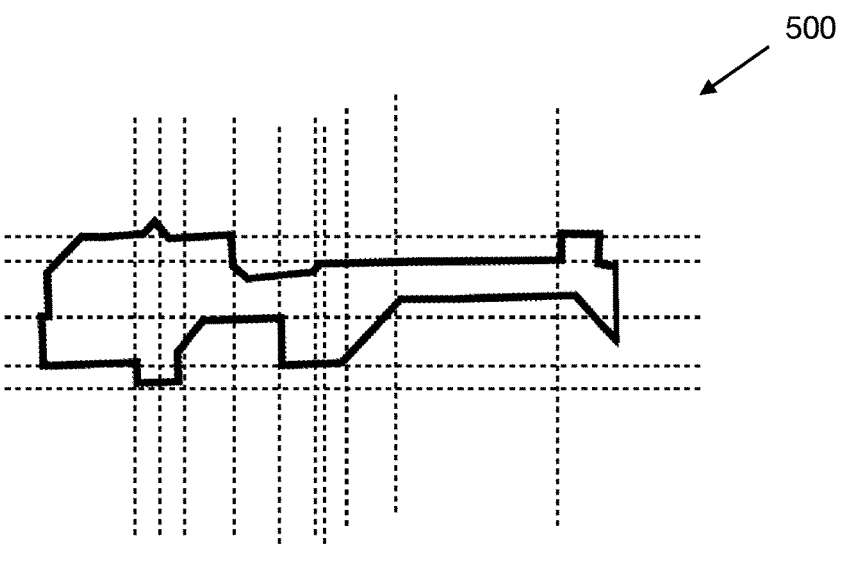
FIG. 5 discloses an irregular shape with various grid densities.

Making such corrections works better when most of the measurements in a shape are roughly correct. Corrections for minor errors should be made while minimizing the amount the shape is modified. A goal is to avoid making significant changes which distort the shape or throw away the recorded information about the shape. FIGS. 1 and 2 describe a very simple example with one vertex out of place. The general problem to be minimized is that all sides may have some amount of error, such at attempting to correct one introduces error for other vertices, and so on. In practice, it is very difficult to manually make a correction without compromising the original shape. FIG. 5 at 500 shows a complex polygon that represents a floorplan where correction is needed, but manual correction is near-impossible.

Embodiments described herein attempts to represent building floor plans as collections of polygon-like shapes. These shapes often have minor errors in angle, or position, either due to errors in the scan process, or due to errors in construction. This results in ugly shapes that also don't work well with CAD tools; as described, known correction methods present their own set of difficulties. Embodiments described herein provide a framework for correcting these kinds of errors using specific relationships relating to buildings and floor plans. Simply, machine learning multi-variable optimization is used to is used to determine a better alignment of vertices in a polygon-like shape while simultaneously determining the shape with the least movement of the vertices.

The machine learning optimization may accept vertices as input and then as output may have two different cost functions, one that measures alignment of segments defined by the vertices, and one that measures movement of the vertices. These cost functions are then used by the machine learning algorithm to increase the accuracy of their next set of vertices.

II. Exemplary Computing Environment

Figure 6:
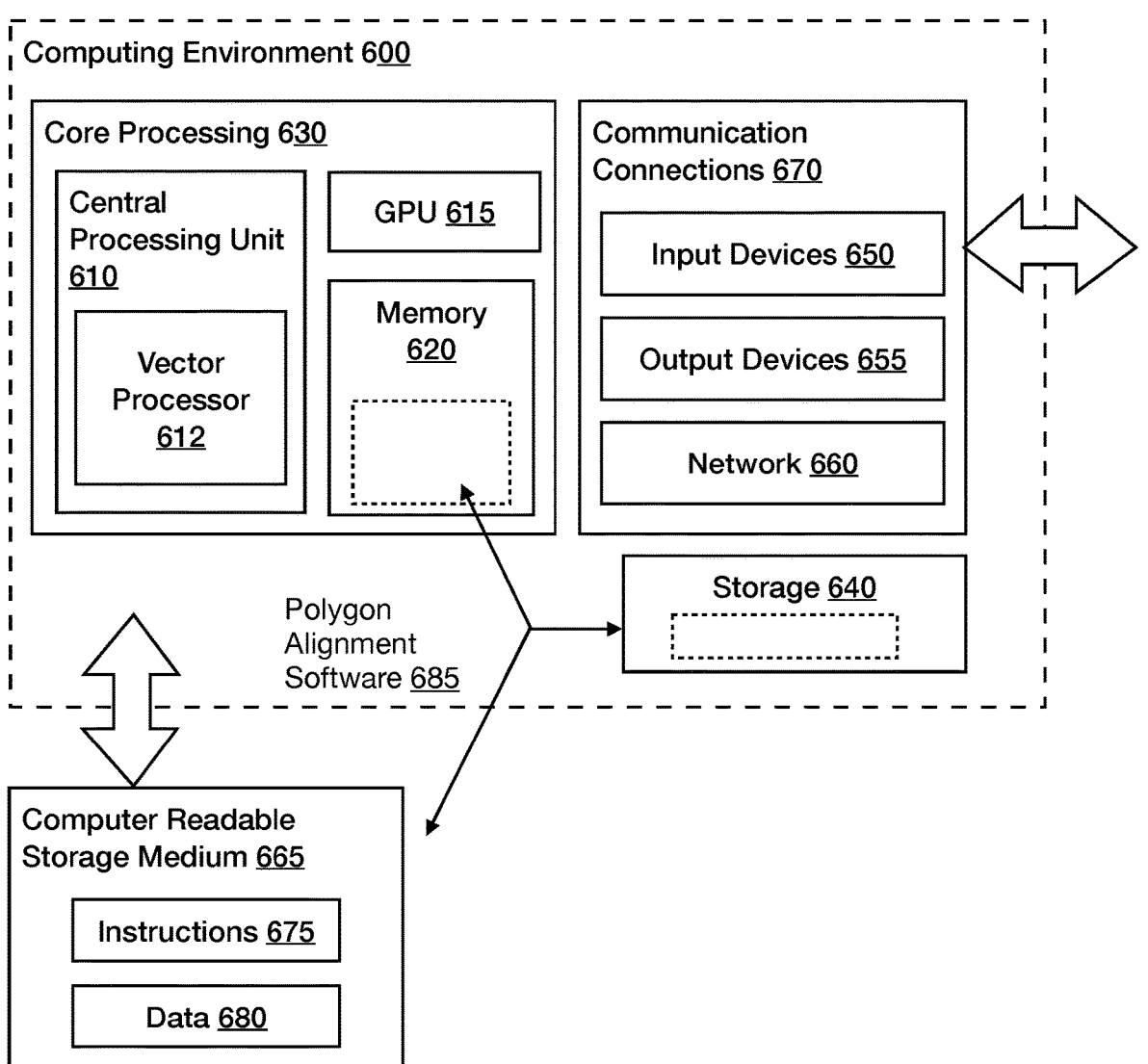
FIG. 6 discloses a computing system in conjunction with which described embodiments can be implemented.

FIG. 6 illustrates a generalized example of a suitable computing environment 600 in which described embodiments may be implemented. The computing environment 600 is not intended to suggest any limitation as to scope of use or functionality of the disclosure, as the present disclosure may be implemented in diverse general-purpose or special-purpose computing environments.

With reference to FIG. 6, the core processing is indicated by the core processing 630 box. The computing environment 600 includes at least one central processing unit 610 and memory 620. The central processing unit 610 executes computer-executable instructions and may be a real or a virtual processor. It may also comprise a vector processor 612 In a multi-processing system, multiple processing units execute computer-executable instructions to increase processing power and as such the vector processor 612, GPU 615, and CPU 610 can be running simultaneously. The memory 620 may be volatile memory (e.g., registers, cache, RAM), non-volatile memory (e.g., ROM, EEPROM, flash memory, etc.), or some combination of the two. The memory 620 stores software 685 implementing the described methods and systems of aligning and modifying inaccurate polygons.

A computing environment may have additional features. For example, the computing environment 600 includes storage 640, one or more input devices 650, one or more output devices 655, one or more network connections (e.g., wired, wireless, etc.) 660 as well as other communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600. The computing system may also be distributed; running portions of the software on different CPUs.

The storage 640 may be removable or non-removable, and includes magnetic disks, magnetic tapes or cassettes, CD-ROMs, CD-RWs, DVDs, flash drives, or any other medium which can be used to store information and which can be accessed within the computing environment 600. The storage 640 stores instructions for the software, such as software 685 to implement systems and methods of aligning and modifying inaccurate polygons.

The input device(s) 650 may be a device that allows a user or another device to communicate with the computing environment 600, such as a touch input device such as a keyboard, video camera, a microphone, mouse, pen, or trackball, a digital camera, a LiDAR device, a scanning device such as a digital camera with a scanner, touchscreen, joystick controller, a wii remote, or another device that provides input to the computing environment 600. For audio, the input device(s) 650 may be a sound card or similar device that accepts audio input in analog or digital form, or a CD-ROM reader that provides audio samples to the computing environment. The output device(s) 655 may be a display, a hardcopy producing output device such as a printer or plotter, a text-to speech voice-reader, speaker, CD-writer, or another device that provides output from the computing environment 600.

The communication connection(s) 670 enable communication over a communication medium to another computing entity. The communication medium conveys information such as computer-executable instructions, compressed graphics information, or other data in a modulated data signal. Communication connections 670 may comprise input devices 650, output devices 655, and input/output devices that allows a client device to communicate with another device over network 660. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 660 may be a combination of multiple different kinds of wired or wireless networks. The network 660 may be a distributed network, with multiple computers, which might be building controllers, acting in tandem. A communication connection 670 may be a portable communications device such as a wireless handheld device, a personal electronic device, etc.

Computer-readable media are any available non-transient tangible media that can be accessed within a computing environment. By way of example, and not limitation, with the computing environment 600, computer-readable media include memory 620, storage 640, communication media, and combinations of any of the above. Computer readable storage medium 665 which may be used to store computer readable media comprises instructions 675 and data 680. Data Sources may be computing devices, such as general hardware platform servers configured to receive and transmit information over the communications connections 670. The computing environment 600 may be an electrical controller that is directly connected to various resources, such as HVAC resources, and which has CPU 610, a GPU 615, Memory 620, input devices 650, communication connections 670, and/or other features shown in the computing environment 600. The computing environment 600 may be a series of distributed computers. These distributed computers may comprise a series of connected electrical controllers.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

Figure 7:
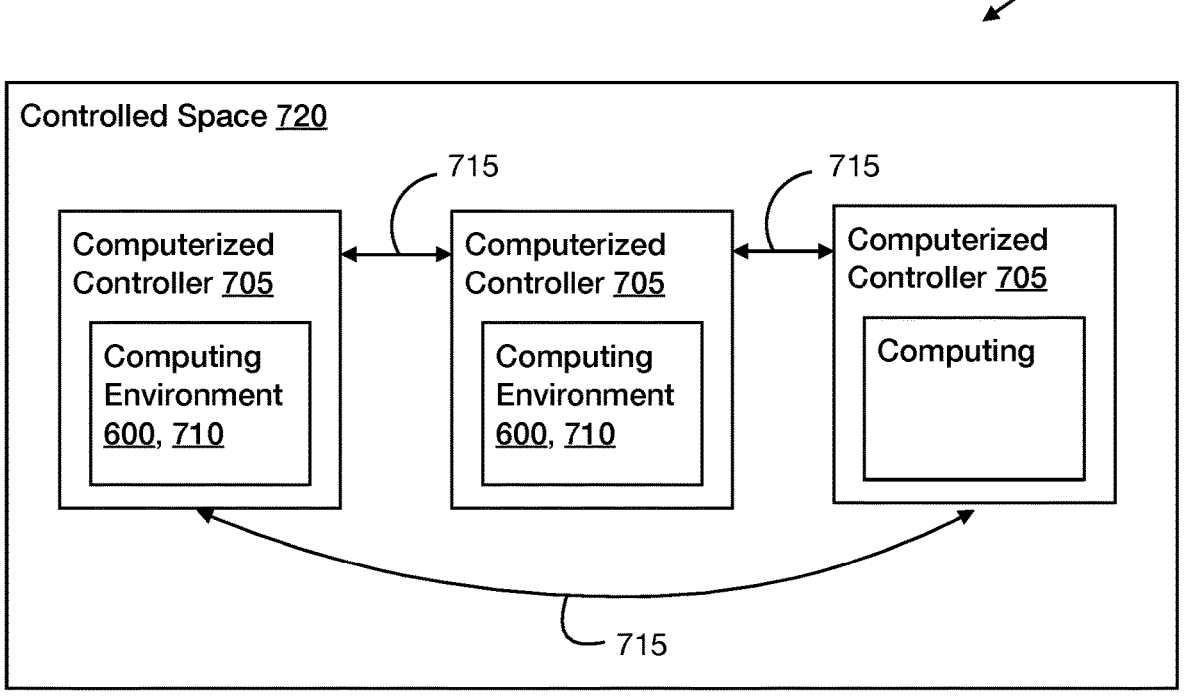
FIG. 7 discloses a distributed computing system with which embodiments disclosed herein may be implemented.

FIG. 7 depicts a distributed computing system 700 with which embodiments disclosed herein may be implemented. Two or more computerized controllers 705 may incorporate all or part of a computing environment 600, 710. These computerized controllers 705 may be connected 715 to each other using wired or wireless connections. The controllers may be within a controlled space 720. A controlled space 720 may be a space that has a resource, sensor, or other equipment that can modify or determine one or more states of the space, such as a sensor (to determine space state), a heater, an air conditioner (to modify temperature); a speaker (to modify noise), locks, lights, etc. A controlled space may be divided into zones, which might have separate constraint state curves. Controlled spaces might be, e.g., an automated building, a process control system, an HVAC system, an energy system, an irrigation system, a building—irrigation system, etc. These computerized controllers 705 may comprise a distributed system that can run without using connections (such as internet connections) outside of the computing system 700 itself. This allows the system to run with low latency, and with other benefits of edge computing systems. The computerized controllers may run using an internal network with no outside network connection. This allows for a much more secure system much more invulnerable to outside attacks, such as viruses, ransomware, and just generally, computer security being breached in many other ways.

Figure 8:
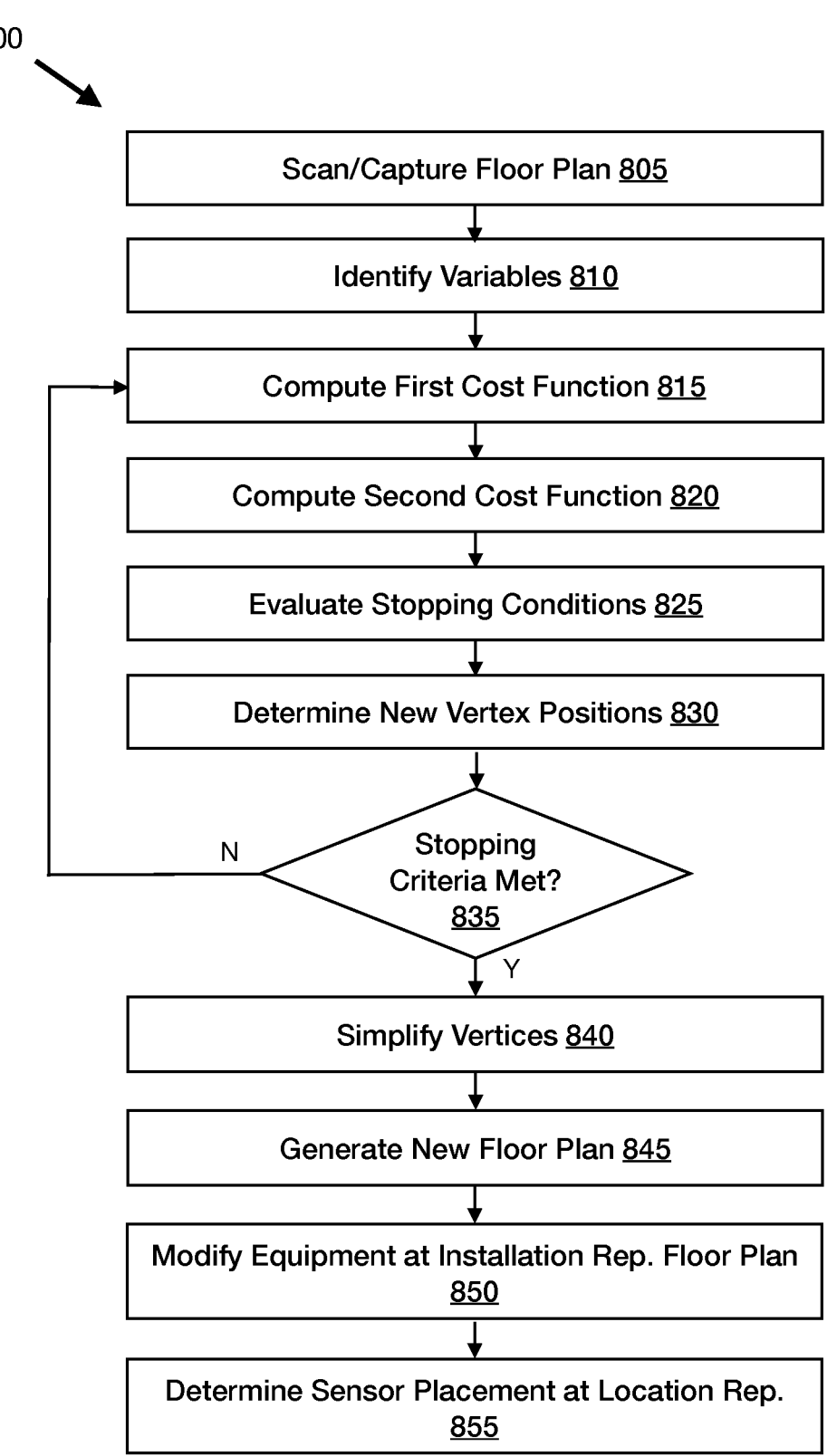
FIG. 8 discloses a flowchart describing a high level method to align polygon-like representations of building floor plans with inaccuracies with which embodiments disclosed herein may be implemented.

III. Exemplary Disclosure for Aligning Polygon-Like Representations of Building Floor Plans with Inaccuracies FIG. 8 at 800 is a flow diagram which describes at a high level a computer-implemented method of aligning a polygon-like representation of a building floor plan, the plan with some unknown amount of inaccuracies. The polygon-like representation of a building may be comprised of straight and curved segments. In some embodiments, the computer-implemented method 800 may be implemented in one or more processing devices (e.g., a digital processor, an analog processor, a digital circuit designed to process information, an analog circuit designed to process information, a state machine, and/or other mechanisms for electronically processing information, a multiprocess system, etc.) The one or more processing devices may include one or more devices executing some or all of the operations of method 800 in response to instructions stored electronically on an electronic storage medium. The computer-implemented method may be executed on a personal computer device such as a mobile phone, a tablet, etc. The one or more processing devices may include one or more devices configured through hardware, firmware, and/or software to be specifically designed for execution of one or more of the operations of method 800.

At operation 805, a floor plan (or similar structure) is captured and turned in a polygon-like representation. Such polygon-like representations may be created by methods and systems described in patent application Ser. No. 17/459,084, "Capturing Environmental Features Using 2D and 3D Scans", filed Sep. 15, 2021 and incorporated herein by reference in its entirety. Generally, any polygon or polygon-like representation that is thought to have some inaccuracies may be used with methods and systems described herein. For clarity, the word "polygon" may be substituted for "polygon-like representation." The variables are the positions of the vertices in the polygon. If the polygon is two-dimensional, then if we have n vertices in an n-sided polygon, then there are 2n variables that will be used in the optimization; in a three-dimensional polygon, there are 3n variables. At operation 810, variables are derived from vertices in the polygon-like representation.

At operation 815, a first cost function is computed. A "cost function," generally, is a function that determines how close a machine learning answer is to the desired answer—the ground truth. That is, it quantifies the error between the predicted value and the desired value. This cost function returns a cost. The cost function may use a least squares function, a Mean Error (ME), Mean Squared Error (MSE), Mean Absolute Error (MAE), a Categorical Cross Entropy Cost Function, a Binary Cross Entropy Cost Function, or a cost function specific to a given problem, to arrive at the answer. In some implementations, the cost function is a loss function. In some implementations, the cost function is a threshold, which may be a single number that indicates the machine learning answer is close enough to the ground truth—the desired answer. In other implementations, the cost function may be a slope. The slope may also indicate that the simulated truth curve and the ground truth are of sufficient closeness. When a cost function is used, it may be time variant. The cost function may read in a cost (a value from a cost function) and determine if that cost meets criteria such that a goal has been reached, such that the simulation iterations stop. Such criteria may be the cost reaching a certain value, being higher or lower than a certain value, being between two values, etc. A cost function may also look at the time spent running the simulation model overall and/or how may iterations have been made to determine if the cost function has been met.

In embodiments disclosed here, the first cost function measures how far the vertices of the polygon-like representation have been moved from their original locations. An illustrative embodiment of this cost function will be described with reference to FIG. 9.

At operation 820, the variables are input into a second cost function that measures how well the vertices of the polygon-like representation are aligned. The first cost function will take the positions of the vertices as inputs, and return a score which measures how well the overall shape is aligned. This is done to ensure that the corrected shape does not deviate too far from its original. One such function is the following:

$$g(x_1, \ldots, x_n) = \sum_{i=1}^{n} \|x_i - p_i\|^2,$$

where p_{I} is their initial position.

At operation 825, stopping criteria is evaluated using the first cost function and the second cost function. This stopping criteria may be a weighting of the first cost function and a weighting of the second cost function reaching a minimum value. For example, the weighting of the first cost function may be 1.0 and the weighting of the second cost function may be 0.5, or vice-versa. The weighting of the first cost function may be 1.0 and the weighting of the second cost function 1.0, or different weightings may be used. The stopping criterion may be to stop after a certain number of iterations have been run, after a certain amount of computer time has been used, or a different criterion may be used. In some implementations, multiple stopping criteria may be used. For example, a weighting may be used, a maximum amount of computer time may be used and a maximum number of iterations may be used, with the stopping criteria being met when the first criterion among the list is met. So, if the maximum number of iterations is met first, then the stopping criteria will consider being met.

At operation 830, new vertex positions are determined using machine learning. Machine learning is used to determine the new set of vertices based on the first cost function and the second cost function. A variety of multi-variable optimization methods can be applied to perform this. For example, the machine learning algorithm (or optimization methods) may include Gradient Descent, methods based on Newton's method, and inversions of the Hessian using conjugate gradient techniques, Evolutionary computation such as Swarm Intelligence, Bee Colony optimization; self-organizing migrating algorithm (SOMA), Particle Swarm, Non-linear optimization techniques, Nelder-Mead, or other methods known by those of skill in the art. Generally, the vertex locations are used as the variables in the machine learning algorithm, then the two costs from the two cost functions are used to determine the new sets of values. Typically, numerical optimizers struggle with many variables. In embodiments disclosed herein, that the original uncorrected shape is already presumably close to the solution helps make the method successful, as the optimizer does not have to aimlessly search around a sparse space. The initial values are close to a solution, it just needs to refine them. In addition, even if a global minimum cannot be found in an allotted time, any improvement will result in an improved shape which more closely matches the expressed preferences. In other words, it is still beneficial even if the machine learning optimizer does not find an absolute minimum or fully minimize the cost function.

At decision point 835, if the stopping criteria is not met, then the method is iterated again, starting at operation 815. If the stopping criteria is met, then at decision point 840, the vertices may be simplified. Vertex simplification is discussed with more specificity with reference to FIGS. 10-13 and the associated text. At operation 845, a new floor plan is generated using the new positions of the vertices. This floor plan may then be used for multiple purposes, such as by being imported into a CAD or other drawing program, it may be used to determine necessary building components, such as HVAC components, when designing a building, etc. At operation 850, the polygon-based model of the floor plan (that has now been smoothed of at least some irregularities) may be used to modify the location of equipment at the location represented by the floor plan. This may include determining the initial equipment placement during a designing stage, finding an optimal equipment location after a building exists, etc. At operation 855, the polygon-based model of the floor plan may be used to determine sensor placement at the location.

Figure 9:
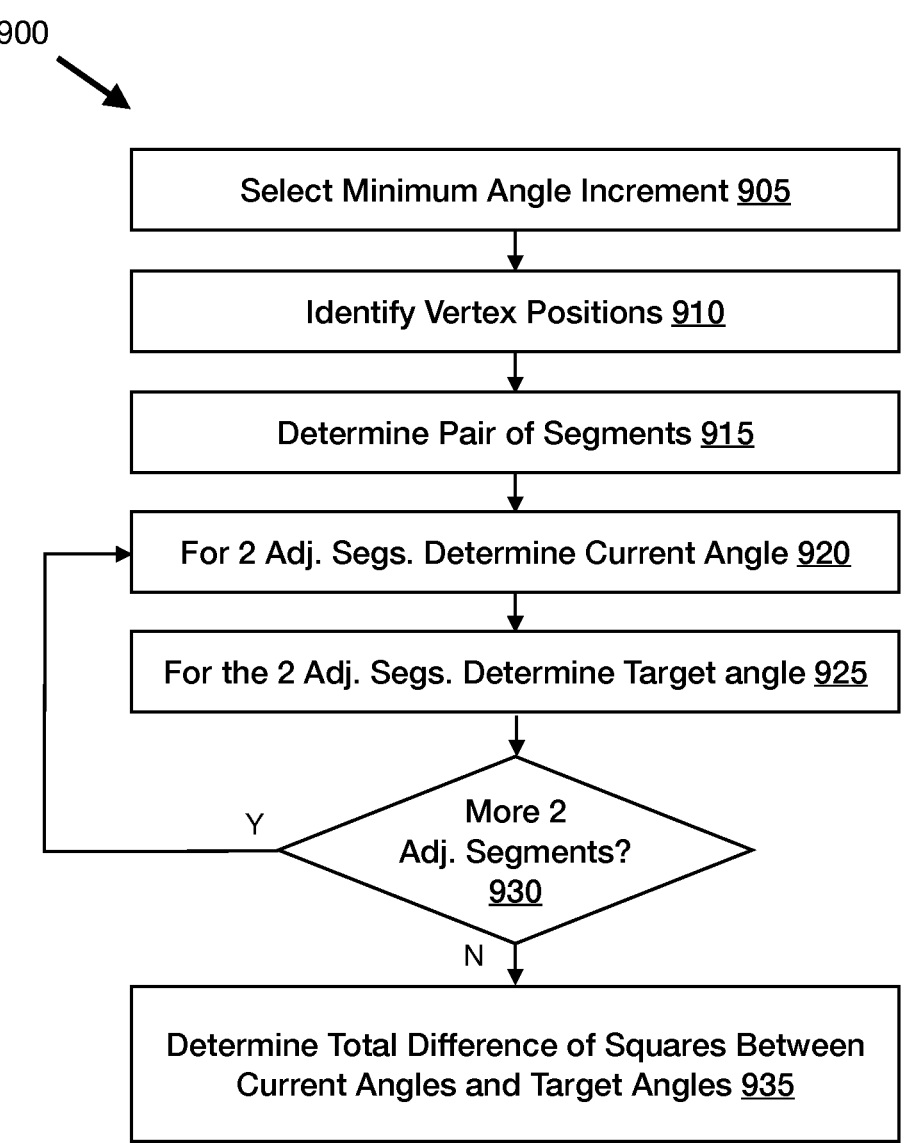
FIG. 9 discloses a flowchart describing a method which measures how well the vertices of the polygon-like representation are aligned with which embodiments disclosed herein may be implemented.

FIG. 9 at 900 is a flow diagram which discloses a method to measure how well vertices of a polygon-like representation are aligned. At operation 905, a minimum angle increment, θ, is selected. This increment may be selected as a value that lies between over- and under-correcting the given floor plan. If a smaller error tolerance is required, then a smaller minimum angle increment may be used, and vice-versa. The smaller the minimum angle increment, the more difficult the optimization should be expected to be. In some instances, the minimum angle increment may be 7.5 degrees—π/24 radians. Other floor plans may use a different minimum angle increment.

At operation 910, vertex positions are identified in the current polygon-like representation. At operation 915, a pair of segment of the polygon-like representation that share a vertex—adjacent segments are determined; that is, they are located. At operation 920, the current angle between the adjacent segments are determined. At operation 925, for these adjacent segments, the multiple of the minimum angle increment which is closest to the minimum angle—the target angle—is determined. At decision point 930, it is determined if there are more adjacent segments whose current and target angles have yet to be determined. If so, then continue at operation 920. If not, then at operation 935 the total difference of the squares between each current angle and the corresponding target angle is determined. An equation which expresses this difference of squares calculation is:

$$f(x_1, \ldots, x_n) = \sum_{i=1}^{n} \|\arccos(\langle x_{i+1} - x_i, x_i - x_{i-1}\rangle) - \theta_i\|^2.$$

Figure 10:
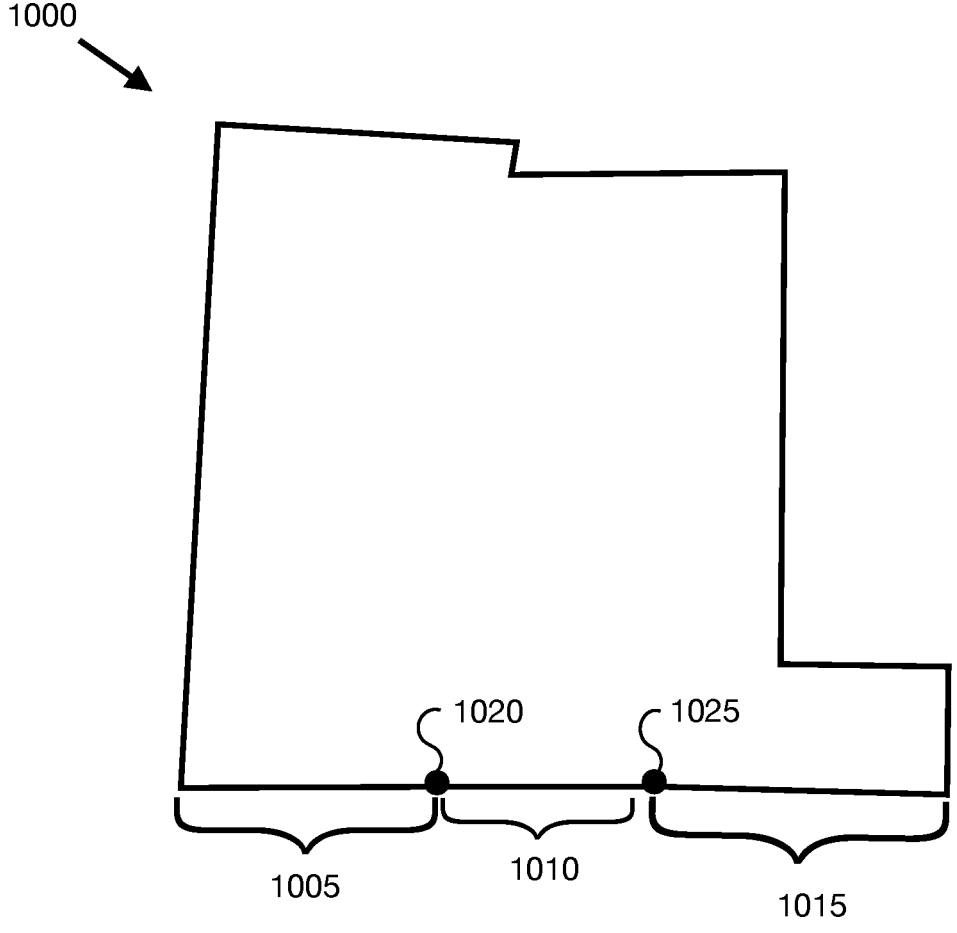
FIG. 10 discloses a removable vertex in a polygon with which embodiments disclosed herein may be implemented.

FIG. 10 at 1000 discloses a removable vertex in a polygon with which embodiments disclosed herein may be implemented. Aligning shapes provides an additional opportunity to remove unnecessary vertices. This reduces storage, processing, and makes the shape easier to manipulate. After minor deviations in angle and position are corrected, some vertices may no longer contribute to the shape. These can then be detected and removed, creating a simplified structure with no effect on the polygon. For example, polygon 1000 has been corrected. The lower three segments 1005, 1010, and 1015 are now substantially parallel. Thus, both of the vertices 1020, 1025 could be removed, with one segment being extended across the entire bottom boundary.

Figure 11:
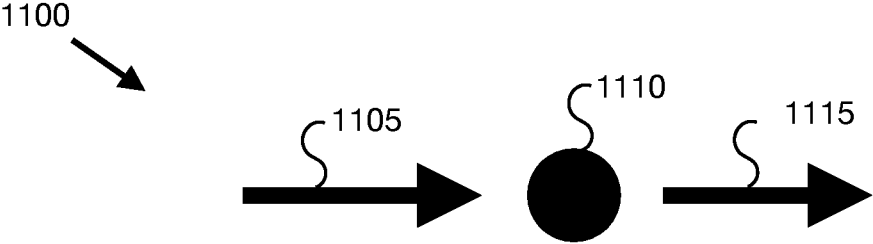
FIG. 11 discloses a removable vertex pattern with which embodiments disclosed herein may be implemented.

FIG. 11 at 1100 discloses a removable vertex pattern with which embodiments disclosed herein may be implemented. A vertex 1110 is removable if the ingoing 1105 and outgoing 1115 directions of its ingoing and outgoing segments are roughly the same. The angle allowed for closeness of the directions can be set with a removable vertex variable, θ. Removable vertices can be identified by iterating through each vertex and removing any for which the angle between the ingoing and outgoing segments is beneath some threshold. One way to do this is shown in the formula below.

$$\theta = \frac{\arccos(\langle x_i - x_{i-1}, x_{i+1} - x_i\rangle)}{\|x_i - x_{i-1}\|\|x_{i+1} - x_i\|}.$$

FIG. 12A at 1200A discloses a curve pattern that may be replaced with straight segments. Floor plans are polygon-like as they are not only composed of straight line segments—they often include segments which are curves. Once a polygon-like object has been aligned, there may be curves which should be replaced with straight segments. The same framework can be applied in these cases. A given polygon-like object may have a rounded corner 1210A, 1215A which joins two line segments, e.g.: 1205A-1210A and 1215A-1220A. The curve angle of a segment can be measured 1225A. Certain segment curves may be assumed to more correctly be corners. The angles that are assumed to be corners can be chosen to be between two curve measurements. These measurements may be around 90 degrees for some polygons, but may also be around other degree measurements, depending on the original polygon shape. When a segment that is a curve (1210A-1215A) between a first curve measurement and a second curve measurement joins two line segments (1205A-1210A and 1215A-1220A), then the segment that is a curve can be deleted, with two line segments being joined, as shown in FIG. 12B at 1200B. The curve segment 1210A, 1215A has been deleted, with the vertices 1205B and 1220B forming segments with a new vertex 1210B at the midpoint of the former curved segment 1210A-1215A.

FIG. 13 at 1300 discloses a preferred alignment between adjacent polygons. The methods and systems disclosed herein may be used with multiple polygon-like segments representing different rooms or other areas. When two rooms are adjacent their polygon representations 1305, 1310 are expected to also be aligned. The two polygons can be aligned simultaneously with an additional term in the sum which expresses a preference for the two adjacent walls to be parallel. These walls are represented within the polygons as segments. The first cost function may be written such that it comprises a preference for the a segment (representing one parallel wall 1315) and a second segment (representing the other parallel wall 1320) to be adjacent. A possible term which expresses this preference and can be added to the function f is:

$$\|\arccos(\langle x_{i+1} - x_i, y_{i+1} - y_i\rangle) - \pi\|^2.$$

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

I claim:

1. A computer-implemented method of aligning a polygon-like representation that comprises a floor plan, the floor plan having inaccuracies, the computer-implemented method comprising:

identifying vertices of the polygon-like representation;

iteratively:

computing a first cost function which measures how well the vertices of the polygon-like representation are aligned;

computing a second cost function which measures how far the vertices of the polygon-like representation have been moved from their original locations;

evaluating a stopping criteria using the first cost function and the second cost function; and using machine learning to determine new positions of the vertices of the polygon-like representation using the first cost function and the second cost function; and when the stopping criteria is met, generating a polygon-based model of the floor plan based on the new positions of the vertices of the polygon-like representation to create a modified floor plan;

wherein the machine learning comprises gradient descent optimization, or a Nelder-Mead optimization method;

wherein the polygon-like representation is two-dimensional; and wherein the second cost function comprises:

$$g(x_1, \ldots, x_n) = \sum_{i=1}^{n} \|x_i - p_i\|^2.$$

2. The computer-implemented method of claim 1, wherein the first cost function comprises:

selecting a minimum angle increment;

identifying positions of the vertices; and determining segments from the positions of the vertices of the polygon-like representation.

3. The computer-implemented method of claim 2, where evaluating a stopping criteria using the first cost function and the second cost function comprises a weighting of the first cost function and a weighting of the second cost function reaching a minimum value.

4. The computer-implemented method of claim 3, wherein the weighting of the first cost function is 1.0 and the weighting of the second cost function is 0.5.

5. The computer-implemented method of claim 4, wherein the polygon-like representation comprise at least one segment that is a curve, and wherein when a segment that is a curve between a first curve measurement and a second curve measurement joins two line segments, then deleting the segment that is a curve and joining the two line segments.

6. The computer-implemented method of claim 5, further comprising a second polygon-like representation with a second segment, the second segment adjacent to a first segment in the polygon-like representation and wherein the first cost function further comprises a preference for the first segment and the second segment to be parallel.

7. A system to correct a polygon-like representation that comprise a floor plan, the floor plan with inaccuracies, using machine learning optimization, the system comprising: a memory; a processor in operable communication with the memory, the processor configured to correct a two-dimensional polygon-like representation that comprise a floor plan, comprising:

identifying vertices of the polygon-like representation;

iteratively:

computing a first cost function which measures how well the vertices of the polygon-like representation are aligned;

computing a second cost function which measuring how far the vertices of the polygon-like representation have been moved from their original locations;

evaluating a stopping criteria using the first cost function and the second cost function; and using machine learning to determine new positions of the vertices of the polygon-like representation using the first cost function and the second cost function; and when the stopping criteria is met, generating a polygon-based model of the floor plan based on the new positions of the vertices of the polygon-like representation;

wherein the machine learning comprises gradient descent optimization, or a Nelder-Mead optimization method;

wherein the polygon-like representation is two-dimensional; and wherein the second cost function comprises:

$$g(x_1, \ldots, x_n) = \sum_{i=1}^{n} \|x_i - p_i\|^2.$$

8. The system of claim 7, wherein the first cost function comprises:

selecting a minimum angle increment;

identify positions of the vertices; and determining segments from the positions of the vertices of the polygon-like representation.

9. The system of claim 8, wherein the minimum angle increment is 7.5 degrees.

10. The system of claim 9, further comprising a second polygon-like representation with a second segment, the second segment adjacent to a first segment in the polygon-like representation and wherein the first cost function further comprises a preference for the first segment and the second segment to be parallel.

11. The system of claim 10, wherein the preference for the first segment and the second segment to be parallel comprises $$f(x_1, \ldots, x_n) = \sum_{i=1}^{n} \|\arccos(\langle x_{i+1} - x_i, x_i - x_{i-1} \rangle) - \theta_i\|^2.$$

12. A computer-readable non-transitory storage medium configured with data and instructions which upon execution by at least one processor cause one or more devices to perform an optimization method of aligning a polygon-like representation that comprises a floor plan with inaccuracies, the optimization method comprising:

identifying vertices of the polygon-like representation;
iteratively:

computing a first cost function which measures how
    well the vertices of the polygon-like representation
    are aligned;

computing a second cost function which measuring
    how far the vertices of the polygon-like representa-
    tion have been moved from their original locations;

evaluating a stopping criteria using the first cost func-
    tion and the second cost function; and using machine learning to determine new positions of
    the vertices of the polygon-like representation using
    the first cost function and the second cost function;
    and when the stopping criteria is met, generating a polygon-
based model of the floor plan based on the new posi-
tions of the vertices of the polygon-like representation;

wherein the machine learning comprises gradient descent
optimization, or a Nelder-Mead optimization method;

wherein the polygon-like representation is two-dimen-
sional; and wherein the second cost function comprises:

$$g(x_1, \ldots, x_n) = \sum_{i=1}^{n} \|x_i - p_i\|^2.$$

13. The computer-readable non-transitory storage
medium of claim 12, further comprising an ingoing segment
and an outgoing segment; and wherein when the stopping
criteria is met then simplifying vertices by iterating through
each vertex and removing those for which an angle between
the ingoing segment and the outgoing segment is beneath
some threshold.

14. The computer-readable non-transitory storage
medium of claim 13, wherein the angle between the ingoing
segment and the outgoing segment is determined by $$\theta = \frac{\arccos(\langle x_i - x_{i-1}, x_{i+1} - x_i \rangle)}{\|x_i - x_{i-1}\|\|x_{i+1} - x_i\|}.$$

15. The computer-readable non-transitory storage
medium of claim 14 wherein the polygon-based model of
the floor plan is used to modify equipment location at a
location represented by the floor plan.

16. The computer-readable non-transitory storage
medium of claim 12, further comprising the polygon-based
model of the floor plan configured to determine sensor
placement at a location represented by the floor plan.

17. The computer-implemented method of claim 2, fur-
ther comprising:

for each two adjacent segments determining a current
    angle;

for each two adjacent segments determining a multiple of
    the minimum angle increment closest to the current
    angle to designate a corresponding target angle; and determining a total difference of squares between each
    current angle and each corresponding target angle.

18. The system of claim 7, where evaluating a stopping
criteria using the first cost function and the second cost
function comprises a weighting of the first cost function and
a weighting of the second cost function reaching a minimum
value.

19. The system of claim 8, further comprising:

for each two adjacent segments determining a current
    angle;

for each two adjacent segments determining a multiple of
    the minimum angle increment closest to the current
    angle to designate a corresponding target angle; and determining a total difference of squares between each
    current angle and each corresponding target angle.

20. The method of claim 1, further comprising using the
modified floor plan to determine at least one required
building component.

\* \* \* \* \*